UNITED STATES PATENT OFFICE.

JOHN L. KELLOGG, OF BATTLE CREEK, MICHIGAN.

BEVERAGE EXTRACT.

1,177,038.  Specification of Letters Patent.  Patented Mar. 28, 1916.

No Drawing.  Application filed December 19, 1914.  Serial No. 878,031.

*To all whom it may concern:*

Be it known that I, JOHN LEONARD KELLOGG, a citizen of the United States, residing at Battle Creek, in the county of Calhoun and State of Michigan, have invented a new and useful Improvement in the Manufacture of Beverage Extracts, (Case D,) of which the following is a specification.

My invention relates in general to the manufacture of beverage extracts, in powdered or granular form, quickly soluble in water, from starch-bearing materials such as wheat, corn, rye, barley or other cereals, beans, peas, nuts, taro, arrow root, fruits, sugar and the like. These extracts are intended to be dissolved usually in hot water for use as a healthful beverage, in place of coffee and other beverages considered less healthful.

I am aware that United States patents to Gale No. 48,268, dated June 20, 1865, and to Barotte No. 439,318, dated October 28, 1890, describe a soluble coffee powder produced by evaporation in the ordinary way from an ordinary decoction, extract or solution of coffee.

I am also aware that British patent to Reichert No. 9,133 of 1903, describes a soluble beverage powder produced in the same way from chicory, the solid soluble extract thus obtained consisting of extractive matter in solid water soluble form of roasted starchy matter and caramelized saccharine matter.

I am also aware that British Patent No. 6,262 of 1895 describes a solid soluble beverage powder produced in the same way from barley malt flour and bran, the solid soluble extract thus obtained consisting of extractive matter in comminuted condition of a roasted cereal or cereal products.

I am also aware that since 1895 a liquid beverage extract made by percolation from a mixture of roasted wheat and bran and caramelized molasses has been in general public use throughout the world, the greatest amount of said mixture of roasted wheat, bran and caramelized molasses having been sold under the adopted name of "Postum Cereal." In 1909 and subsequently, I made a soluble beverage powder of this mixture of roasted wheat and bran and caramelized molasses by evaporating to dryness in the usual way the solution obtained by percolation from this mixture.

The subject of the present application is an improvement on the broad inventive process of a performance of which the above is a specific example, and the product of which is a fine dry powder which is of particularly desirable flavor and dissolves instantly in hot water.

The nature and scope of this improvement will be particularly claimed hereinafter, but in order that it may be fully understood, I shall first describe in detail one method in which the improved process may be performed.

I may use, as the primary materials for making the roasted product from which I prepare the soluble extract, grains or cereals such as wheat, rye, corn, barley, malted or unmalted, or other like starchy materials as above-mentioned, or mixtures of the same, and saccharine material added thereto, such as New Orleans molasses, sugar, syrups, either cane or glucose, and even figs, prunes or other fruits. It is generally preferred, however, to employ a mixture of wheat, bran and New Orleans molasses. Ordinary wheat bran is mixed with New Orleans molasses and steamed in order to render the mass homogeneous, dried and roasted, the temperature being carried to the point of browning and thoroughly caramelizing the sugar of the molasses. A slight carbonizing is not injurious and brings out desirable flavors. Wheat, preferably whole wheat, is roasted to a dark brown color to effect dextrinizing the starchy contents of the grain, then ground to rather coarse powder and mixed with the roasted bran and molasses. The proportions of the ingredients may vary within wide limits, dependent on the characteristics desired to be imparted to the final product. Having prepared the roasted product from which it is desired to make the solid extract, the product is next treated with water to dissolve out its soluble constituents. Either a part or all the soluble constituents may be removed, depending on the desired characteristics of the solid extract in matters pertaining to flavor, aroma, etc.

The extraction may be effected by treating the roasted product with either cold or warm water, or by boiling the same therewith, but it is generally preferred to use percolation with water of moderate temperature, at about 50 to 60 C., thereby obtaining usually a clear solution which is ready for evaporation without undergoing a separate step of filtration. Furthermore, percolation permits control of the extraction whereby solutions of different strength and qualities may be prepared if desired.

While the solution extracted from roasted wheat bran and molasses, prepared as above described, may and sometimes does yield as high as 50% in soluble extractive matter and makes an excellent beverage, yet a solution of 30% possesses in a marked degree the desirable properties of the roasted product.

No particular apparatus for percolating need be described, as it forms no part of the present invention, such devices being well known and on the market.

To reduce the soluble extract or solution thus obtained to the desired dry comminuted condition, I now evaporate and boil down the solution preferably in an ordinary vacuum pan, until it will test approximately 50 B. on the hydrometer. This evaporated solution is then by preference pumped at high velocity, through a finely perforated spray nozzle. I find I accomplish the desired results by a spray velocity estimated at from five thousand to twenty thousand feet a minute, the powder being finer as the velocity increases, but the velocity may be either higher or lower than those figures. The fine spray thereby formed is heated, preferably by driving it directly in front of a hot air blast, whose temperature in practice varies from 150 to 250 F., according to the color of the final product desired, the color becoming darker as the temperature is raised. The sprayed product thus heated and dried is, preferably, thrown against a baffle plate and collected in the form of a fine homogeneous powder for packing and distribution. The homogeneity of the heated and dried spray thus obtained cannot be accomplished by grinding a dried mass of the product, and is very different from the product so obtained.

By the improvement thus instanced on my original process, the flavor and solubility of the product is greatly improved and the process of manufacture very much facilitated and perfected.

I have thus described in detail one particular method of performing my improved process and making my improved product, but to determine the spirit and scope of my invention reference is to be had to the following claim.

I claim as my invention:

A solid soluble extract for preparing beverages in the form of a fine powder and prepared by desiccating a spray of a solution of the soluble matter of a roasted starch bearing material and a caramelized saccharine body.

JOHN L. KELLOGG.

In presence of—
C. H. HUGHES,
F. A. CLARK.